(12) United States Patent
Zhang et al.

(10) Patent No.: US 10,298,848 B2
(45) Date of Patent: May 21, 2019

(54) MOTOR, GIMBAL AND AIRCRAFT

(71) Applicant: AUTEL ROBOTICS CO., LTD., Shenzhen, Guangdong (CN)

(72) Inventors: Zhengli Zhang, Guangdong (CN); Fazhan Chen, Jiangsu (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/979,968

(22) Filed: May 15, 2018

(65) Prior Publication Data
US 2018/0262664 A1    Sep. 13, 2018

Related U.S. Application Data

(63) Continuation of application No. PCT/CN2015/093874, filed on Nov. 5, 2015.

(30) Foreign Application Priority Data

Oct. 26, 2015 (CN) .......................... 2015 1 0701266

(51) Int. Cl.
| | |
|---|---|
| *H04N 5/232* | (2006.01) |
| *B64D 47/08* | (2006.01) |
| *H02K 7/08* | (2006.01) |
| *H02K 7/14* | (2006.01) |
| *H02K 11/00* | (2016.01) |
| *H02K 11/215* | (2016.01) |
| *H02K 11/30* | (2016.01) |

(Continued)

(52) U.S. Cl.
CPC ........... *H04N 5/2328* (2013.01); *B64D 47/08* (2013.01); *F16M 11/125* (2013.01);
(Continued)

(58) Field of Classification Search
None
See application file for complete search history.

(56) References Cited

U.S. PATENT DOCUMENTS

| | | | |
|---|---|---|---|
| 2005/0052569 A1 | 3/2005 | Ibaraki et al. | |
| 2013/0251557 A1* | 9/2013 | Ota | ........................ F04B 17/03 417/410.1 |

(Continued)

FOREIGN PATENT DOCUMENTS

| | | |
|---|---|---|
| CN | 1606225 A | 4/2005 |
| CN | 103825408 A | 5/2014 |

(Continued)

OTHER PUBLICATIONS

International Search Report dated Jul. 27, 2016; PCT/CN2015/093874.

*Primary Examiner* — William B Perkey
(74) *Attorney, Agent, or Firm* — Ladas & Parry LLP

(57) ABSTRACT

The present invention discloses a motor, a gimbal including the motor and an aircraft including the gimbal. The motor includes a base, a rotation shaft, a stator assembly, a first bearing, a stator bearing and a rotor assembly that is used for driving an external member to rotate. The rotation shaft has a first end portion, a second end portion and a middle portion connecting the first end portion to the second end portion. The base is connected to the first end portion by using the first bearing. The rotor assembly is connected to the middle portion. The stator bearing, the rotor assembly and the first bearing are sequentially arranged along an axial direction of the rotation shaft. The stator assembly is connected to the rotation shaft by using the stator bearing.

9 Claims, 2 Drawing Sheets

(51) Int. Cl.
*F16M 11/12* (2006.01)
*F16M 11/20* (2006.01)
*F16M 13/02* (2006.01)
*H02K 5/10* (2006.01)
*H02K 5/24* (2006.01)
*H02K 21/22* (2006.01)

(52) U.S. Cl.
CPC ........ *F16M 11/2014* (2013.01); *F16M 13/02* (2013.01); *H02K 5/10* (2013.01); *H02K 5/24* (2013.01); *H02K 7/083* (2013.01); *H02K 7/14* (2013.01); *H02K 11/215* (2016.01); *H02K 11/30* (2016.01); *H02K 21/22* (2013.01); *H04N 5/23258* (2013.01); *H02K 2211/03* (2013.01)

(56) References Cited

U.S. PATENT DOCUMENTS

| | | | | |
|---|---|---|---|---|
| 2013/0264896 | A1* | 10/2013 | Morita | B29C 45/14639 310/51 |
| 2016/0016674 | A1* | 1/2016 | Zhao | B64D 47/08 244/118.1 |
| 2016/0229556 | A1* | 8/2016 | Zhou | B64D 47/08 |
| 2016/0291445 | A1* | 10/2016 | Fisher, Sr. | G03B 15/006 |
| 2017/0017138 | A1* | 1/2017 | Liang | G03B 15/006 |
| 2017/0094185 | A1* | 3/2017 | Wang | G03B 17/561 |
| 2017/0174362 | A1* | 6/2017 | Zhao | F16M 11/041 |
| 2017/0191613 | A1* | 7/2017 | Liu | B64D 47/08 |
| 2017/0264796 | A1* | 9/2017 | Tian | B64D 47/08 |

FOREIGN PATENT DOCUMENTS

| | | |
|---|---|---|
| CN | 103956846 A | 7/2014 |
| CN | 203832758 U | 9/2014 |
| CN | 104662780 A | 5/2015 |
| CN | 104756373 A | 7/2015 |
| CN | 104908965 A | 9/2015 |
| CN | 204647758 U | 9/2015 |
| DE | 3542542 A1 | 6/1987 |
| EP | 3086451 A1 | 10/2016 |
| FR | 2391908 A1 | 12/1978 |
| WO | 2014/120331 A2 | 8/2014 |
| WO | 2015/149659 A1 | 10/2015 |

* cited by examiner

MOTOR, GIMBAL AND AIRCRAFT

CROSS-REFERENCE

This application is a continuation application of International Application No. PCT/CN2015/093874, filed on Nov. 5, 2015, which claims priority of Chinese Patent Application No. 201510701266.3, filed on Oct. 26, 2015, which is incorporated herein by reference in its entirety.

BACKGROUND

Technical Field

The present invention relates to the field of motor technologies, and in particular, to a motor, a gimbal and an aircraft.

Related Art

A motor is a device that implements conversion between electric energy and mechanical energy. It can provide power for various devices by using a driving torque that is generated. Among devices using a motor, a gimbal can use motor rotation to complete fastening of a shooting device mounted to it, arbitrarily adjust a posture of the shooting device (for example, change a height and/or a direction of the shooting device) and stably keep the shooting device in a definite posture, thereby achieving stability and smoothness of the shooting device, and implementing multi-angle shooting.

In the existing motor, a rotation shaft of the motor is generally connected to an external member, to drive the external member to rotate. By connecting the rotation shaft with the external member, the motor transmits a torque force generated on the rotation shaft to the external member, so that the stable movement of the external member is affected.

SUMMARY

A main objective of preferable embodiments of the present invention is to provide a motor, to reduce a torque force transmitted by the motor to an external member.

A preferable embodiment of the present invention discloses a motor, including a base, a rotation shaft, a stator assembly, a first bearing, a stator bearing and a rotor assembly that is used for driving an external member to rotate, the rotation shaft having a first end portion, a second end portion and a middle portion connecting the first end portion to the second end portion, the base being connected to the first end portion by using the first bearing, the stator bearing and the rotor assembly being disposed on the middle portion, the stator bearing, the rotor assembly and the first bearing being sequentially arranged along an axial direction of the rotation shaft, and the stator assembly being connected to the rotation shaft by using the stator bearing.

Preferably, the rotation shaft is enclosed in a cavity formed by the base, the stator assembly and the rotor assembly.

Preferably, the stator assembly includes a stator and an end cap fastened to the stator and the stator bearing includes a second bearing and a third bearing, the stator being located between the second bearing and the third bearing, the second bearing being disposed close to the rotor assembly, and the third bearing being disposed close to the second end portion.

Preferably, the motor further includes a sensor assembly that detects a rotation angle of the rotation shaft and the sensor assembly includes a sensing driver PCB board, a sensing magnet and a sensing magnetic base for mounting the sensing magnet, the sensing magnetic base being fastened to the second end portion of the rotation shaft, and the sensing driver PCB board and the sensing magnet being disposed between the second end portion and the end cap and fastened to the end cap.

Preferably, the motor further includes a flexible circuit board connected to an external control board, and along the axial direction of the rotation shaft, the stator has a first surface facing the rotor assembly, the flexible circuit board being located on the first surface of the stator.

Another preferable embodiment of the present invention further discloses a gimbal, including the motor described above. Preferably, the rotor assembly includes a rotor and a second axial support arm, the second axial support arm and the rotor being an integrated structure, or the second axial support arm being fastened to the rotor, and the external member being fixedly connected to the second axial support arm.

Preferably, the second axial support arm has a connecting arm portion and a first support arm portion and a second support arm portion that are disposed at two ends of the connecting arm portion, a rotation shaft mounting hole for mounting the rotation shaft being provided in the connecting arm portion, and the first support arm portion and the second support arm portion being symmetrically disposed about an axis of the rotation shaft mounting hole; or the second axial support arm includes a connecting arm portion and a first support arm portion and a second support arm portion that are disposed at two ends of the connecting arm portion, a rotor mounting hole for mounting the rotor being provided in the connecting arm portion, and the first support arm portion and the second support arm portion being symmetrically disposed about an axis of the rotor mounting hole; and the first support arm portion, the connecting arm portion and the second support arm portion form a U-shaped structure.

Preferably, the gimbal further includes a shock absorption assembly, a quick detaching assembly, a Z-axis motor and a first axial support arm;

a first end of the first axial support arm is fixedly connected to the base, and the first axial support arm being perpendicular to the rotation shaft; and a second end of the first axial support arm is connected to the Z-axis motor, and the Z-axis motor is connected to the shock absorption assembly by using the quick detaching assembly, the shock absorption assembly, the quick detaching assembly and the Z-axis motor being sequentially connected in a direction of the first axial support arm.

Preferably, the gimbal further includes a P-axis motor, wherein the P-axis motor is mounted on a free end portion of at least one of the first support arm portion and the second support arm portion of the second axial support arm;

the first axial support arm being perpendicular to the second axial support arm.

A preferable embodiment of the present invention further discloses an aircraft, including the gimbal described above, and further having a body, where the body includes a driving device and a shooting device, the shooting device being disposed on the gimbal, the gimbal being disposed on the bottom of the body, and the driving device being configured to drive the motor to rotate to enable the shooting device to shoot.

According to the motor disclosed in the preferable embodiments of the present invention, a rotor assembly drives an external member to rotate, that is, the rotor assembly is connected to the external member, and the rotor assembly is connected to a non-end portion position of a rotation shaft. Therefore, compared with the prior art in which the external member is connected to an end portion position of the rotation shaft, and a torque force based on an end portion of the rotation shaft is greater than a torque force on a non-end portion of the rotation shaft, the present invention can reduce a torque force that is generated by a rotation shaft and that is transmitted to an external member, thereby improving movement stability of the external member, and additionally reduce a time loss of movement on the rotation shaft, thereby increasing a speed at which the external member responds to motor movement.

Figure 1:
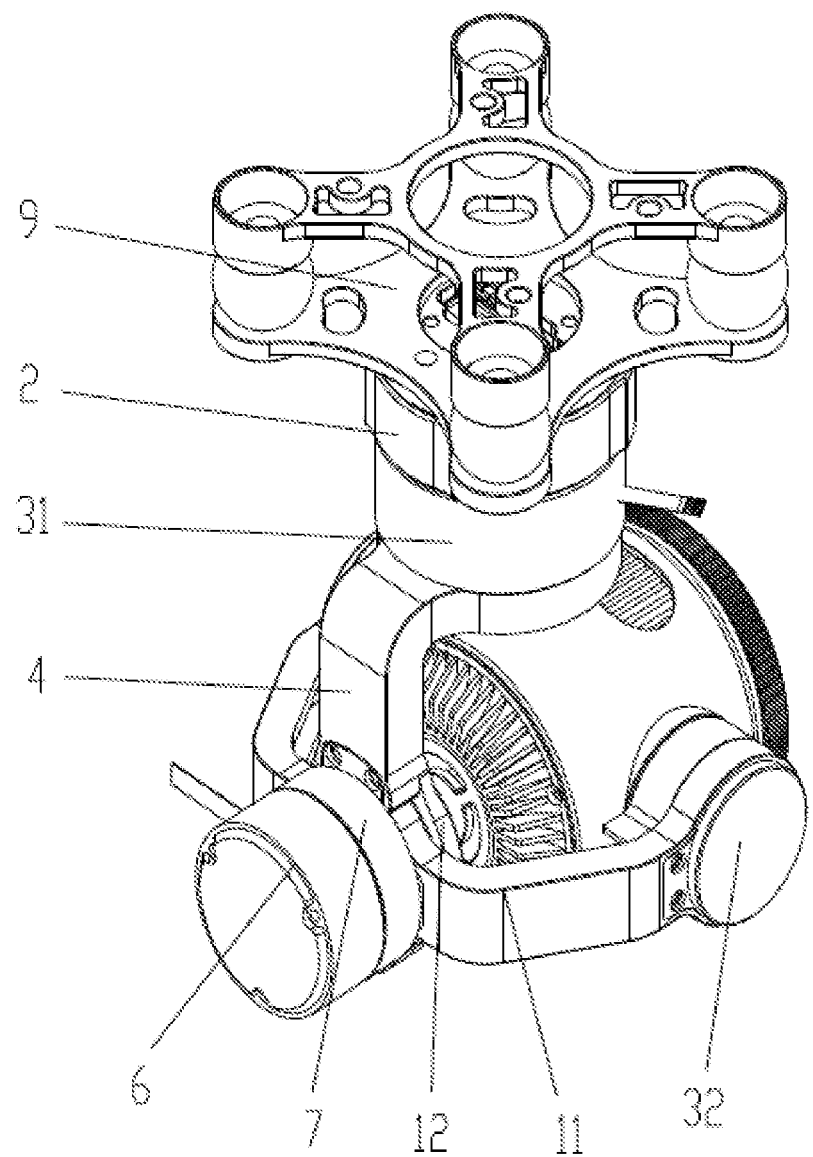
FIG. 1 is a schematic structural diagram of a gimbal according to a preferable embodiment of the present invention.

Reference numerals: 1—rotation shaft; 10—rotor; 11—second axial support arm; 12—base; 2—quick detaching assembly; 31—Z—axis motor; 32—P—axis motor; 4—first axial support arm; 51—sensing driver PCB board; 52—sensing magnet; 53—sensing magnetic base; 54—flexible circuit board; 6—end cap; 7—stator; 81—second bearing; 82—first bearing; 83—third bearing; 9—shock absorption assembly.

DETAILED DESCRIPTION

To make the objectives, technical solutions, and advantages of the present invention clearer and more comprehensible, the following further describes the present invention in detail with reference to the accompanying drawings and embodiments. It should be understood that specific embodiments described herein are merely used for describing the present invention, and are not intended to limit the present invention, and technical features described below may be combined with each other as long the technical features are not mutually contradictory.

The present invention discloses a motor, a gimbal to which the motor is applied and an aircraft to which the gimbal is applied. To describe advantages of the motor in more detail, the motor is applied to the gimbal to provide descriptions. Certainly, the motor may alternatively be applied to another device.

In a preferable embodiment of the present invention, the gimbal may be a uniaxial gimbal, a biaxial gimbal or a triaxial gimbal. As shown in FIG. 1, the gimbal is a triaxial gimbal, and includes a shock absorption assembly 9, a quick detaching assembly 2, a Z-axis motor 31, a first axial support arm 4, a motor that is in another preferable embodiment of the present invention and a P-axis motor 32. When the gimbal is mounted on a carrying device such as an aerial photography aircraft, the shock absorption assembly 9 is rigidly connected to the aerial photography aircraft, to reduce vibration transmitted by the aerial photography aircraft to the gimbal. The shock absorption assembly 9 is detachably connected to the Z-axis motor 31 by using the quick detaching assembly 2, and the shock absorption assembly 9, the quick detaching assembly 2 and the Z-axis motor 31 are sequentially arranged along an axial direction of the Z-axis motor 31. The shape of the first axial support arm 4 is similar to the "L" shape. The P-axis motor 32 is fastened to a rotor assembly of a motor in another preferable embodiment of the present invention, and may rotate with the motor in the another preferable embodiment of the present invention, to drive a load such as a camera or a searchlight.

In another embodiment, when the gimbal is a uniaxial gimbal, it includes a shock absorption assembly 9, a quick detaching assembly 2 and a motor that is in another preferable embodiment of the present invention. When the gimbal is mounted on a carrying device such as an aerial photography aircraft, the shock absorption assembly 9 is rigidly connected to the aerial photography aircraft, to reduce vibration transmitted by the aerial photography aircraft to the gimbal. The shock absorption assembly 9 is detachably connected to the motor in the another preferable embodiment of the present invention by using the quick detaching assembly 2. The shock absorption assembly 9, the quick detaching assembly 2 and the motor in the another preferable embodiment of the present invention are sequentially arranged along an axial direction of the motor in the another preferable embodiment of the present invention. A load such as a camera or a searchlight is connected to a rotor assembly of the motor in the another preferable embodiment of the present invention. When the gimbal is a biaxial gimbal, it includes a shock absorption assembly 9, a quick detaching assembly 2, a Z-axis motor 31, a first axial support arm 4 and a motor that is in another preferable embodiment of the present invention. When the gimbal is mounted on a carrying device such as an aerial photography aircraft, the shock absorption assembly 9 is rigidly connected to the aerial photography aircraft, to reduce vibration transmitted by the aerial photography aircraft to the gimbal. The shock absorption assembly 9 is detachably connected to the Z-axis motor 31 by using the quick detaching assembly 2, and the shock absorption assembly 9, the quick detaching assembly 2 and the Z-axis motor 31 are sequentially arranged along an axial direction of the Z-axis motor 31. The shape of the first axial support arm 4 is similar to the "L" shape. One end of the first axial support arm 4 is connected to an output shaft of the Z-axis motor 31. The motor in the another preferable embodiment of the present invention is fastened to the other end of the first axial support arm 4, and may rotate with the first axial support arm 4. A load such as a camera or a searchlight is carried on a rotor assembly of the motor in the another preferable embodiment of the present invention.

The P-axis motor 32 or the load such as the camera or the searchlight is carried on the rotor assembly of the motor in the another preferable embodiment of the present invention, that is, a rotor assembly is connected to the P-axis motor 32 or the load such as the camera or the searchlight. Compared with the prior art in which the load such as the camera or the searchlight is connected to an end portion position of the rotation shaft, and a torque force based on an end portion of the rotation shaft is greater than a torque force on the rotor assembly, the present invention can reduce a torque force that is generated by a rotation shaft of a motor and that is transmitted to a load such as a camera or a searchlight, thereby improving movement stability of the load such as the camera or the searchlight, and additionally reduce a time loss of movement on the rotation shaft, thereby increasing a speed at which the load such as the camera or the searchlight responds to motor movement.

When the vibration generated from the aerial photography aircraft does not need to be reduced, the shock absorption assembly 9 may not be disposed on the gimbal in any of the foregoing embodiments. In this case, the quick detaching assembly 2 is directly connected to the aerial photography aircraft.

When the gimbal does not need to be quickly detached from a carrying device such as the aerial photography aircraft, the gimbal in any of the foregoing embodiments may not include the quick detaching assembly 2. In this case, the Z-axis motor 31 in the foregoing triaxial gimbal and biaxial gimbal embodiments is directly connected to the aerial photography aircraft, and the motor in the another preferable embodiment of the present invention in the foregoing uniaxial gimbal embodiment is directly connected to the aerial photography aircraft.

Figure 2:
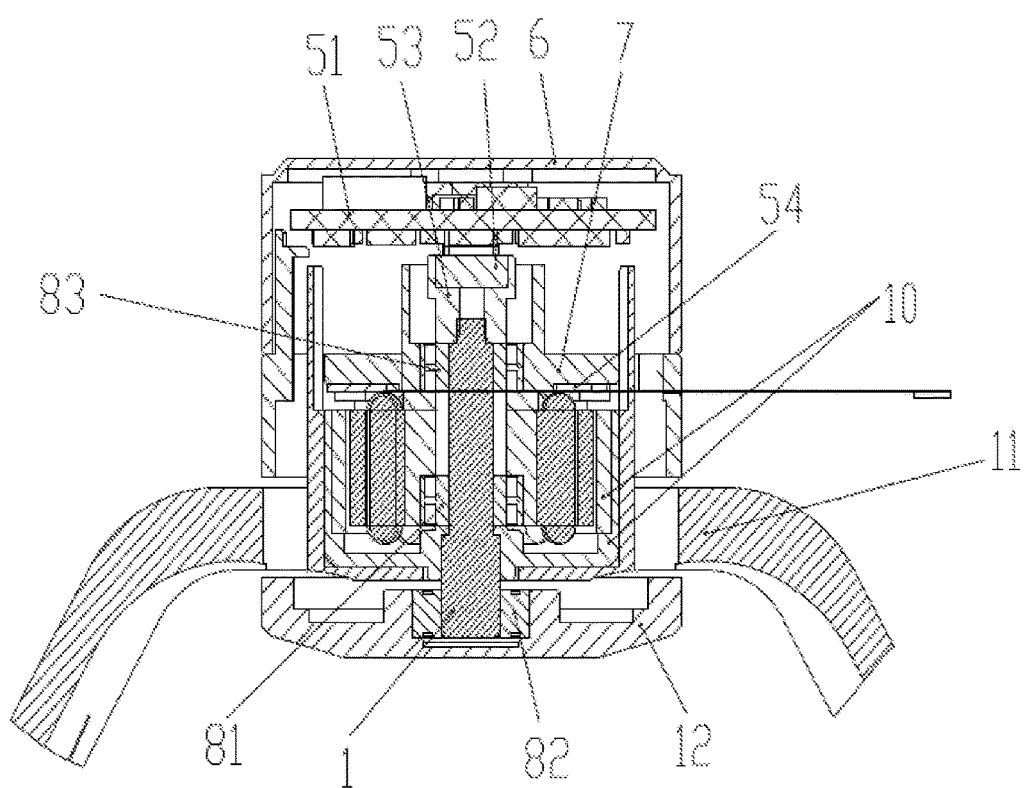
FIG. 2 is a sectional view of a motor according to a preferable embodiment of the present invention.

Referring to FIG. 2, the motor in the another preferable embodiment of the present invention includes a base 12, a rotation shaft 1, a stator assembly, a first bearing 82, a stator bearing and a rotor assembly that is used for driving an external member to rotate. In the foregoing triaxial gimbal embodiment, the external member refers to the P-axis motor 32. In the foregoing uniaxial or biaxial gimbal embodiment, the external member refers to the load such as the camera or the searchlight. The rotation shaft 1 has a first end portion, a second end portion and a middle portion that connects the first end portion and the second end portion, and the base 12 is connected to the first end portion of the rotation shaft 1 by using the first bearing 82. The stator bearing and the rotor assembly are disposed on the middle portion of the rotation shaft 1, that is, the stator bearing and the rotor assembly are disposed on a non-end portion position of the rotation shaft 1. The stator bearing, the rotor assembly and the first bearing 82 are sequentially arranged along an axial direction of the rotation shaft 1, and the stator assembly is connected to the rotation shaft 1 by using the stator bearing. The rotor assembly drives the external member (the P-axis motor 32 in the triaxial gimbal embodiment, or the load such as the camera or the searchlight in the uniaxial or biaxial gimbal embodiment) to rotate, that is, the rotor assembly is connected to the external member and the rotor assembly is connected to the non-end portion position of the rotation shaft 1. Therefore, compared with the prior art in which the external member is connected to an end portion position of the rotation shaft, and a torque force based on an end portion of the rotation shaft is greater than a torque force on a non-end portion of the rotation shaft 1, the present invention can reduce a torque force that is generated by a rotation shaft 1 and that is transmitted to an external member (the P-axis motor 32 in the triaxial gimbal embodiment, or the load such as the camera or the searchlight in the uniaxial or biaxial gimbal embodiment), thereby improving movement stability of the external member (the P-axis motor 32 in the triaxial gimbal embodiment, or the load such as the camera or the searchlight in the uniaxial or biaxial gimbal embodiment), and additionally reduce a time loss of movement on the rotation shaft 1, thereby increasing a speed at which the external member (the P-axis motor 32 in the triaxial gimbal embodiment, or the load such as the camera or the searchlight in the uniaxial or biaxial gimbal embodiment) responds to motor movement.

To simplify a structure of the gimbal in the embodiments of the present invention, in the foregoing triaxial or biaxial gimbal embodiment, the base 12 in the foregoing motor embodiment is a part of the first axial support arm 4, that is, the base 12 is one of free ends of the first axial support arm 4, that is, the base 12 and the first axial support arm 4 are an integrated structure; or the base 12 is fixedly connected to the first axial support arm 4.

The external member is directly connected to the rotor assembly, and the rotation shaft 1 of the motor in the present invention does not need to extend out of the motor to connect to the external member. Therefore, in a preferable embodiment of the present invention, the rotation shaft 1 is enclosed in a cavity formed by the base 12, the stator assembly and the rotor assembly. Such a design can prevent a micro-particle such as dust from entering the inside of the motor through the rotation shaft 1 and affecting performance and a service life of the motor, and can improve safety performance of the motor in the present invention.

To improve output rigidity of the motor in the present invention, and improve stability, a stator assembly in an preferable embodiment of the present invention includes a stator 7 and an end cap 6 fastened to the stator 7. A stator bearing includes a second bearing 81 and a third bearing 83. The stator 7 is located between the second bearing 81 and the third bearing 83, that is, the second bearing 81 and the third bearing 83 are respectively disposed at two ends of the stator 7. The second bearing 81 is disposed close to the rotor assembly, and the third bearing 83 is disposed close to the second end portion of the rotation shaft 1. In the foregoing structure, the second bearing 81 and the third bearing 83 serve as a support, and the stator 7 is mounted between the second bearing 81 and the third bearing 83 that serve as the support, thereby improving rigidity and stability.

The rotor assembly is connected to the non-end portion position of the rotation shaft 1. Specifically, the rotor assembly is connected to a position between the first bearing 82 and the second bearing 81 in the rotation shaft 1, to reduce transmission of a torque force generated by the rotation shaft 1 and increase a speed at which an external member connected to the rotor assembly responds to the rotation shaft 1.

To precisely detect a rotation angle of the rotation shaft 1 in real time, so as to control a rotation speed and a position of the rotation shaft 1, a motor in a preferable embodiment of the present invention further includes a sensor assembly for detecting the rotation angle of the rotation shaft. The sensor assembly includes a sensing driver PCB board 51, a sensing magnet 52 and a sensing magnetic base 53 for mounting the sensing magnet 52. The sensing magnetic base 53 is fastened to a second end portion (away from the base 12) of the rotation shaft 1. The sensing driver PCB board 51 and the sensing magnet 52 are disposed between the second end portion and the end cap 6 and the sensing driver PCB board 51 is fastened to the end cap 6 of the stator assembly.

The motor in the embodiments of the present invention further includes a flexible circuit board 54 connected to an external control board, and along the axial direction of the rotation shaft 1, the stator 7 has a first surface facing the rotor assembly. The flexible circuit board 54 is located on the first surface of the stator 7.

The rotor assembly in the embodiments of the present invention includes a rotor 10 and a second axial support arm 11. The second axial support arm 11 and the rotor 10 are an integrated structure. Alternatively, the second axial support arm 11 is fastened to the rotor 10. An external member is fixedly connected to the second axial support arm 11, and the external member rotates with the second axial support arm 11. The second axial support arm 11 that is originally a structure of a gimbal is disposed in such a manner that the second axial support arm 11 and the rotor 10 are an integrated structure or the second axial support arm 11 is fastened to the rotor 10. Therefore, a motor is no longer an independent part relative to the gimbal, that is, the motor is one part included in the gimbal, so that the gimbal has a more compact structure, a smaller volume and a lighter weight, helping increase a battery life of an aerial photography aircraft that carries the gimbal.

A first end of the first axial support arm 4 is fixedly connected to the base 12, the first axial support arm 4 is perpendicular to the second axial support arm 11 and the first axial support arm 4 is perpendicular to the rotation shaft 1. A second end of the first axial support arm 4 is connected to the Z-axis motor 31. The Z-axis motor 31 is connected to the shock absorption assembly 9 by using the quick detaching assembly 2. The shock absorption assembly 9, the quick detaching assembly 2 and the Z-axis motor 31 are sequentially connected in a direction of the first axial support arm 4.

The second axial support arm 11 and the rotor 10 are an integrated structure. Specifically, the second axial support arm 11 has a connecting arm portion and a first support arm portion and a second support arm portion that are disposed at two ends of the connecting arm portion. A rotation shaft mounting hole for mounting the rotation shaft 1 is provided in the connecting arm portion. The first support arm portion and the second support arm portion are symmetrically disposed about an axis of the rotation shaft mounting hole. The first support arm portion, the connecting arm portion and the second support arm portion form a U-shaped structure. Further, the P-axis motor 32 is mounted on a free end portion of at least one of the first support arm portion or the second support arm portion of the second axial support arm 11.

The second axial support arm 11 is fastened to the rotor 10. Specifically, the second axial support arm 11 includes a connecting arm portion and a first support arm portion and a second support arm portion that are disposed at two ends of the connecting arm portion. A rotor mounting hole for mounting the rotor 10 is provided in the connecting arm portion. The first support arm portion and the second support arm portion are symmetrically disposed about an axis of the rotor mounting hole.

An embodiment of the present invention further provides an aircraft, which includes the gimbal described above and further has a body. The body includes a driving device and a shooting device, the shooting device being disposed on the gimbal, the gimbal being disposed on the bottom of the body, and the driving device being configured to drive the motor to rotate to enable the shooting device to shoot.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A motor, comprising:
   a rotation shaft comprising a first end portion, a second end portion and a middle portion connecting the first end portion to the second end portion;
   a first bearing;
   a base connected to the first end portion by using the first bearing;
   a stator assembly;
   a stator bearing; and
   a rotor assembly that is used for driving an external member to rotate;
   wherein the stator bearing and the rotor assembly are disposed on the middle portion;
   wherein the stator bearing, the rotor assembly and the first bearing are sequentially arranged along an axial direction of the rotation shaft, and the stator assembly being connected to the rotation shaft by using the stator bearing;
   wherein the rotation shaft is enclosed in a cavity formed by the base, the stator assembly and the rotor assembly.

2. The motor according to claim 1, wherein the stator assembly comprises a stator and an end cap fastened to the stator and the stator bearing comprises a second bearing and a third bearing, the stator being located between the second bearing and the third bearing, the second bearing being disposed close to the rotor assembly, and the third bearing being disposed close to the second end portion.

3. The motor according to claim 2, wherein the motor further comprises a sensor assembly that detects a rotation angle of the rotation shaft and the sensor assembly comprises a sensing driver PCB board, a sensing magnet and a sensing magnetic base for mounting the sensing magnet, the sensing magnetic base being fastened to the second end portion of the rotation shaft, and the sensing driver PCB board and the sensing magnet being disposed between the second end portion and the end cap and fastened to the end cap.

4. The motor according to claim 3, wherein the motor further comprises a flexible circuit board connected to an external control board, and along the axial direction of the rotation shaft, the stator has a first surface facing the rotor assembly, the flexible circuit board being located on the first surface of the stator.

5. A gimbal, comprising:
   a motor;
   a quick detaching assembly;
   a shock absorption assembly, which is detachably connected to the motor by using the quick detaching assembly;
   wherein the motor comprising:
      a rotation shaft comprising a first end portion, a second end portion and a middle portion connecting the first end portion to the second end portion;
      a first bearing;
      a base connected to the first end portion by using the first bearing;
      a stator assembly;
      a stator bearing; and
      a rotor assembly that is used for driving an external member to rotate;
      wherein the stator bearing and the rotor assembly are disposed on the middle portion;
      wherein the stator bearing, the rotor assembly and the first bearing are sequentially arranged along an axial direction of the rotation shaft, and the stator assembly being connected to the rotation shaft by using the stator bearing.

6. The gimbal according to claim 5, further comprising a Z-axis motor and a first axial support arm;
   a first end of the first axial support arm is fixedly connected to the base, and the first axial support arm being perpendicular to the rotation shaft; and
   a second end of the first axial support arm is connected to the Z-axis motor, and the Z-axis motor is connected to the shock absorption assembly by using the quick detaching assembly, the shock absorption assembly, the quick detaching assembly and the Z-axis motor being sequentially connected in a direction of the first axial support arm.

7. The gimbal according to claim 6, wherein the rotor assembly comprises a rotor and a second axial support arm, the second axial support arm and the rotor being an integrated structure, or the second axial support arm being fastened to the rotor, and the external member being fixedly connected to the second axial support arm.

8. The gimbal according to claim 7, wherein the second axial support arm has a connecting arm portion and a first support arm portion and a second support arm portion that are disposed at two ends of the connecting arm portion, a rotation shaft mounting hole for mounting the rotation shaft being provided in the connecting arm portion, and the first support arm portion and the second support arm portion being symmetrically disposed about an axis of the rotation shaft mounting hole; or the second axial support arm comprises a connecting arm portion and a first support arm portion and a second support arm portion that are disposed at two ends of the connecting arm portion, a rotor mounting hole for mounting the rotor being provided in the connecting arm portion, and the first support arm portion and the second support arm portion being symmetrically disposed about an axis of the rotor mounting hole; and the first support arm portion, the connecting arm portion and the second support arm portion form a U-shaped structure.

9. The gimbal according to claim 8, further comprising a P-axis motor, wherein the P-axis motor is mounted on a free end portion of at least one of the first support arm portion and the second support arm portion of the second axial support arm;

the first axial support arm being perpendicular to the second axial support arm.

* * * * *